Oct. 8, 1929.  A. E. FIXEL  1,730,927

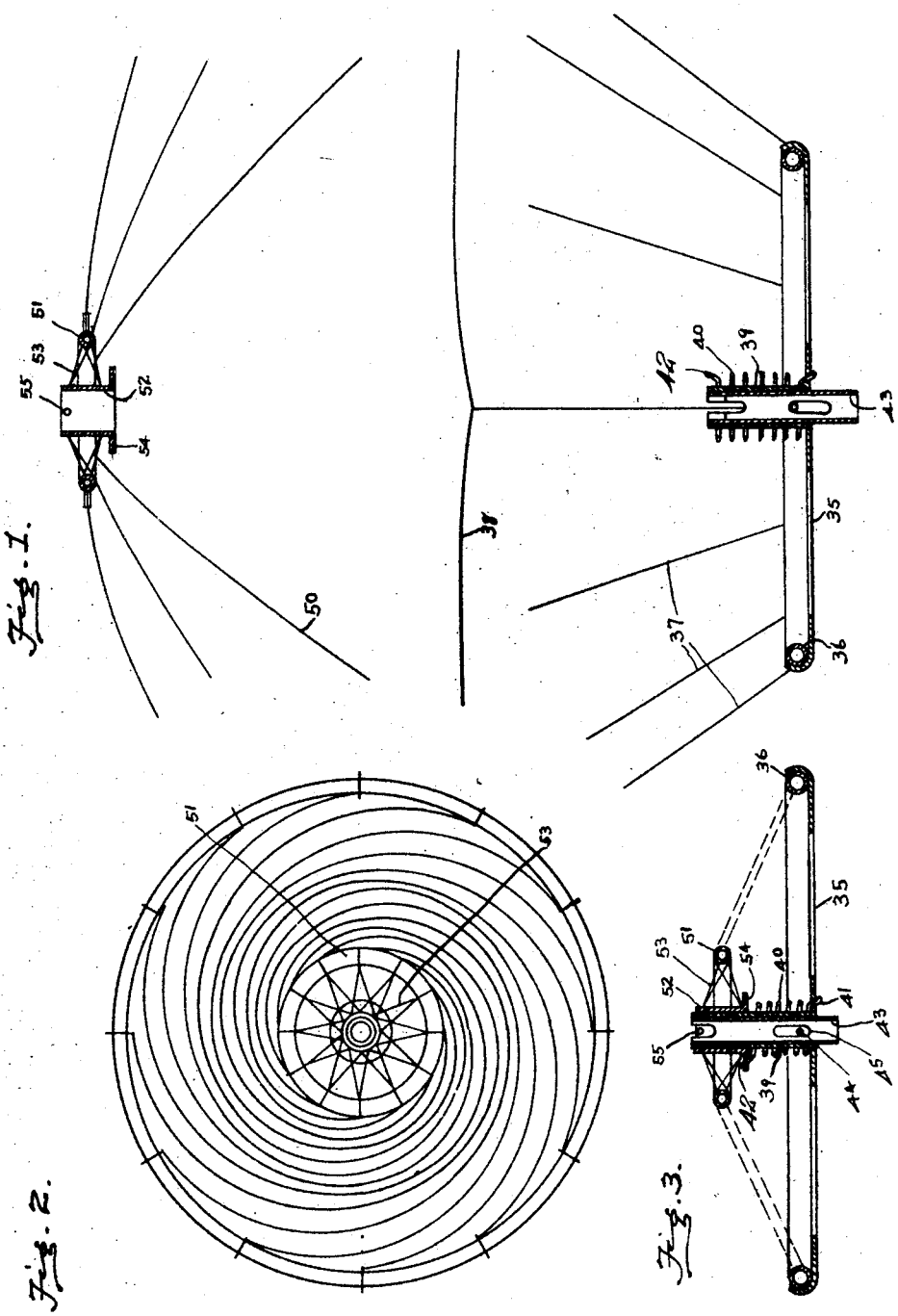

SAFETY DEVICE FOR AEROPLANES

Filed July 17, 1925  5 Sheets-Sheet 2

INVENTOR
Arthur E. Fixel
BY
Francis D Hardesty
his ATTORNEY

Oct. 8, 1929.  A. E. FIXEL  1,730,927
SAFETY DEVICE FOR AEROPLANES
Filed July 17, 1925  5 Sheets-Sheet 3
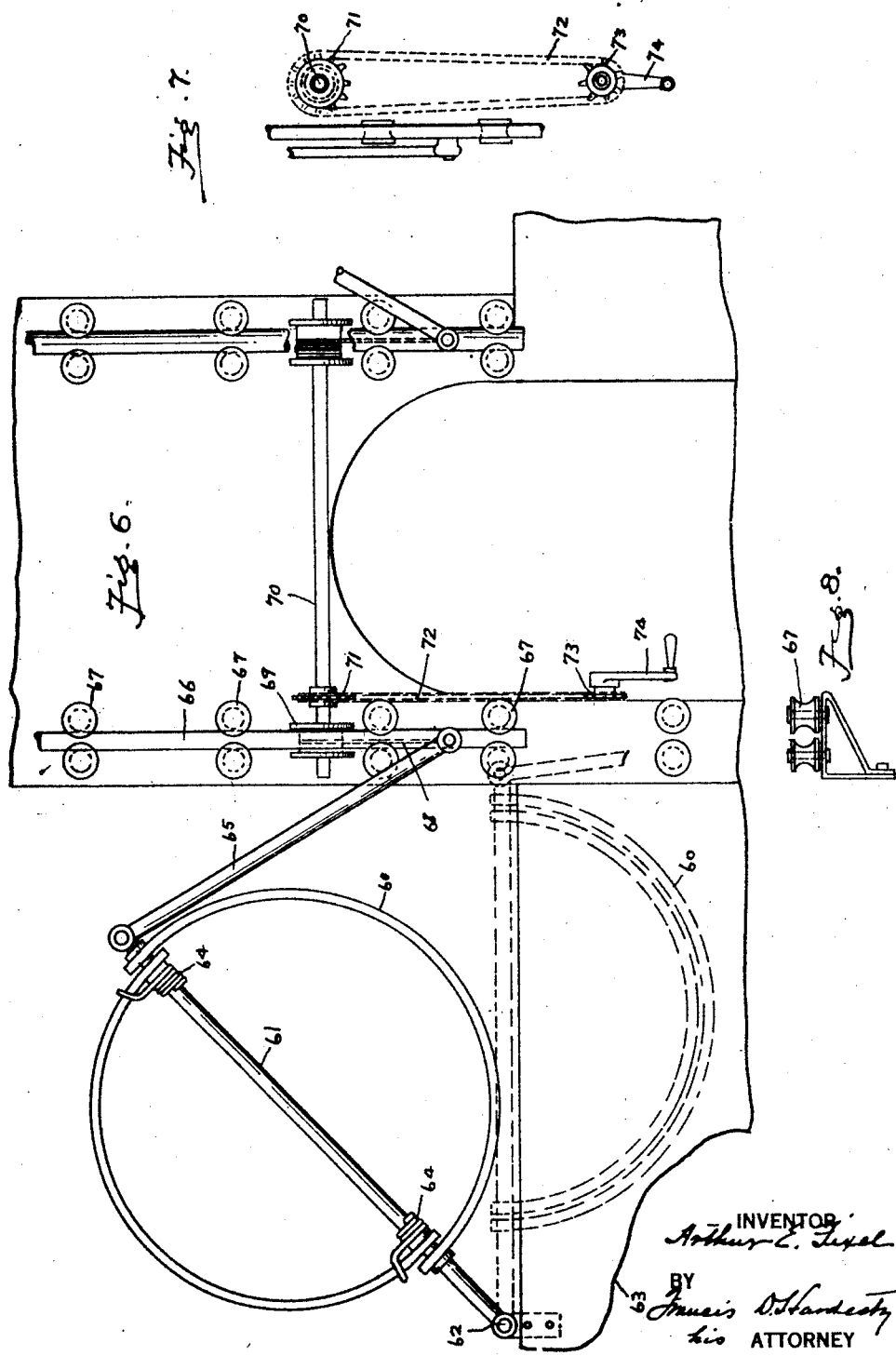

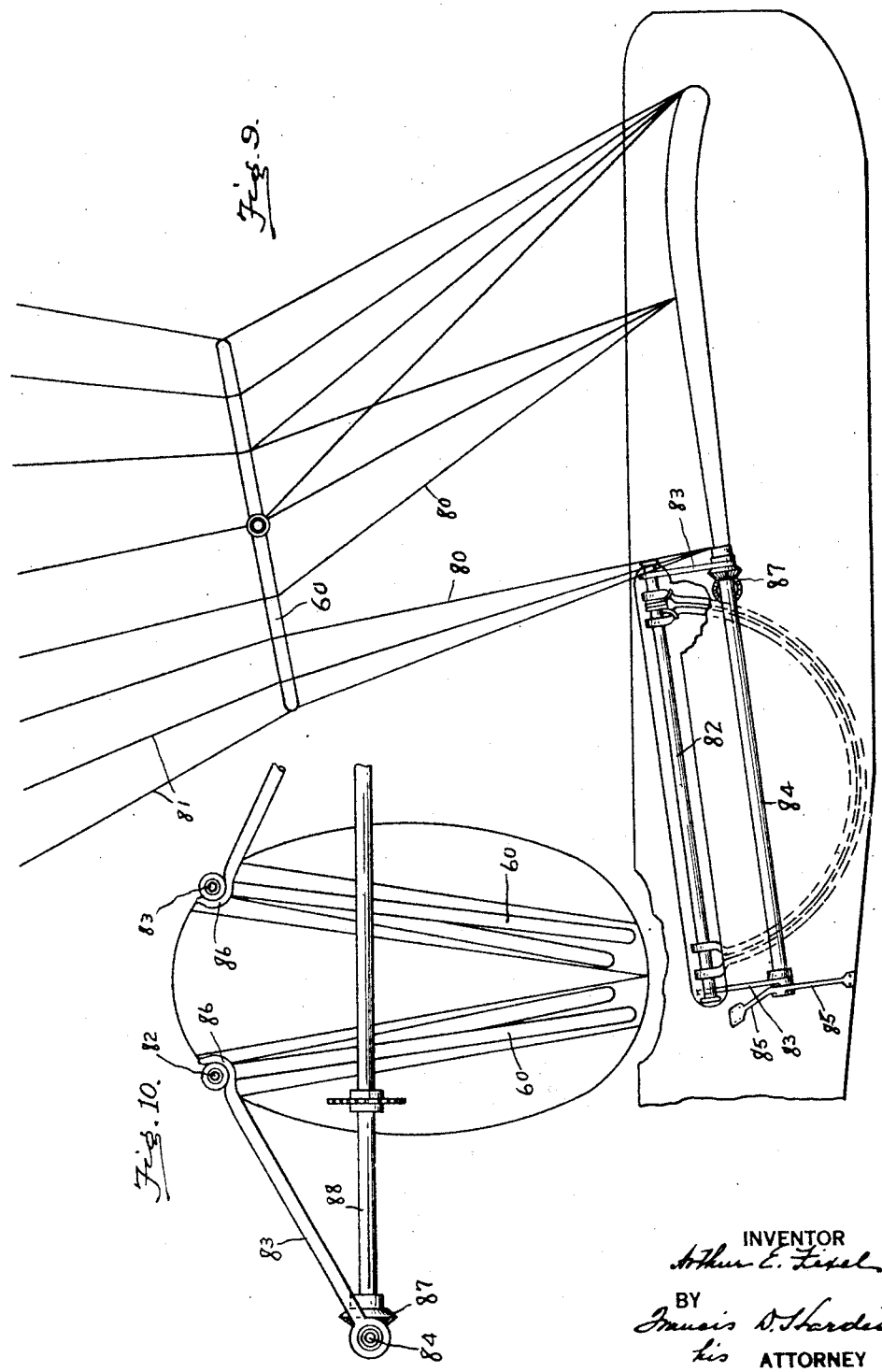

Oct. 8, 1929.  A. E. FIXEL  1,730,927
SAFETY DEVICE FOR AEROPLANES
Filed July 17, 1925   5 Sheets-Sheet 5

INVENTOR
Arthur E. Fixel
BY
Francis D. Hardesty
his ATTORNEY

Patented Oct. 8, 1929

1,730,927

UNITED STATES PATENT OFFICE

ARTHUR E. FIXEL, OF DETROIT, MICHIGAN

SAFETY DEVICE FOR AEROPLANES

Application filed July 17, 1925. Serial No. 44,232.

The present invention relates to safety devices for aeroplanes and specifically to devices adapted to prevent the falling of the plane and the usual consequent result of loss of plane and passengers.

Among the objects of the invention is to provide means operable to support the plane in case of an accident to the power plant and the resulting failure of air support therefor.

Another object is to provide means to insure the operation of the supporting means.

Still another object is means for stabilizing the supporting means.

With these and other objects in view, as will readily appear to those skilled in the art, the invention consists broadly in securing in supporting relation to an aeroplane a plurality of parachutes, at locations determined by weight distribution in the plane; in packing the parachutes in the aeroplane structure in such manner as not to offer air resistance but yet permit easy and quick release of the parachute; and in means to insure quick and sure opening of the parachutes.

Reference should be made to the following description and to the drawings, in which:

Fig. 1 shows a vertical section through an open parachute provided with the packing and opening means, parts being omitted.

Fig. 2 is a plan of a folded parachute like that of Fig. 1.

Fig. 3 is a vertical section through the center of Fig. 2.

Fig. 6 is a plan view of a somewhat different form of mechanism for housing and opening a parachute.

Figs. 7 and 8 are detail views of the structure shown in Fig. 6.

Fig. 9 is a side elevation of another modified form of mechanism.

Fig. 10 is an end view of the same.

Similar numerals refer to like parts throughout the several views on the drawings.

As already stated, the preferred form of embodiment of the invention involves the fixing to an aeroplane of a plurality of parachutes at points determined by the weight distribution of the aeroplane. This means that, with the lighter planes, three parachutes will usually be used, one to support each wing and one to support the rear portion of the fuselage.

These parachutes may be packed in the upper portions of the parts to be supported and secured to these parts, all being simultaneously releasable. Such an arrangement is indicated in Figs. 1 to 5 inclusive.

Figure 4:
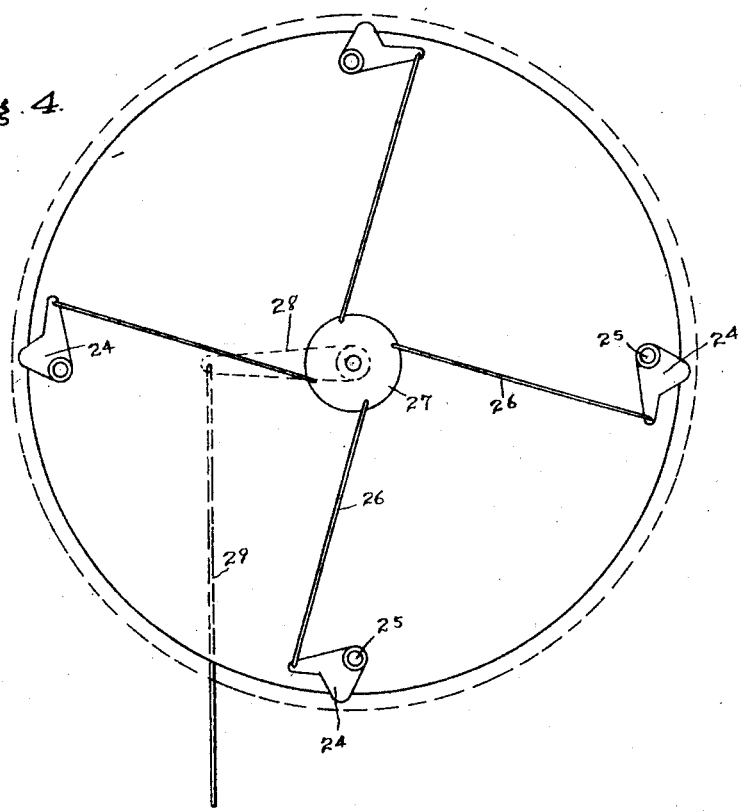
Fig. 4 is a plan view of the cover fastening means for a parachute pocket in a horizontal surface.
Figure 5:
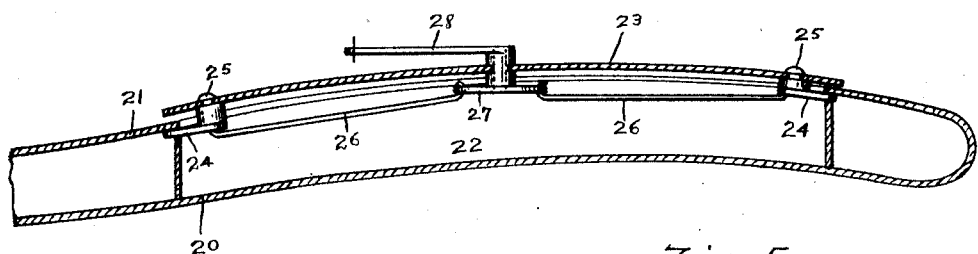
Fig. 5 is a vertical section through an aeroplane wing showing also in section the cover of Fig. 4.

In these figures an aeroplane wing is indicated in section at 20 having a portion of its upper surface 21 cut away to permit the utilization of the space inside as a pocket 22 for a parachute. This pocket 22 will be covered by a lid 23 provided with means for quick release thereof. Such a means is indicated in Fig. 4 as consisting of four latches 24, pivoted to the lid 23 as at 25 and linked as by rods 26 to a plate 27 also pivoted to the lid and rotatable by means of an arm 28. The arm 28 may be above the lid 23 while the other mechanism is preferably below and within the pocket 22, in order to offer as little wind resistance as possible.

This form of lid retaining means may be easily and quickly released by moving the handle 28 through the cord 29, which latter will of course extend to the fuselage in reach of the aviator. Further, as there preferably will be several of the pockets containing parachutes all of the cords 29 can be arranged to be operated simultaneously.

As mentioned above, pocket 22 is designed to contain packed therein a parachute and means for insuring the opening thereof by initially spreading it to a considerable proportion of its normal area. Such means and the method of packing the parachute are shown in Figs. 1, 2 and 3. In these figures there is shown a plate or spider 35 having fixed to its outside edge a ring 36 to which are secured the cords 37 of parachute 38. Further, at the center of spider 35 there is fixed a tube 39 which carries around it a spring 40, fixed against rotation, as by passing one end 41 through a suitable hole in spider 35, and having its other end 42 free to turn. Also, slidable within tube 39 is a second tube 43, limited in its movement by a pin 44 fixed to tube 39 and extending into slot 45 in tube 43. The upper end of tube 43 is also slotted for a purpose to be described in connection with the description of parachute 38.

Parachute 38 may be of substantially conventional form except for the central part thereof, but it is preferred to place along the seams thereof as at 50 light ropes or small rattans, preferably the latter on account of their springiness. Whichever is used, it is laid along a seam 50 and sewed therein and also secured at one end to a cord 37 and at its other end to a center ring 51 to which is also secured the upper edge of the parachute cloth. This formation leaves a central opening in the parachute for stabilizing. It also forms a rigid support for a centrally placed tube 52 which is secured to the ring 51 by spokes of wire 53. Tube 52 is flanged at its lower end as at 54 and near its upper end is traversed by a pin 55. Also the flange 54 is provided with a hole in which may be secured the free end of spring 40.

In packing the parachute in pocket 22, inside of which has already been firmly secured the spider 35, the parachute 38 is folded in a spiral as indicated in Fig. 2 and the tube 52 placed over tube 39 with the free end of spring 40 passing into flange 54. The tube 52 is then pressed onto the tube 39 in such fashion as to both compress and wind up the spring 40. When this has been done, tube 43 is pushed up so that its slotted upper end embraces pin 55 and prevents turning of tube 52. The compression of spring 40 is maintained by placing the lid 23 on the pocket and latching.

When the parachute has been so packed in its container 22, it is ready for instant use and its opening is assured, for, assuming the plane to be in flight, when the latches are released, the compressed spring 40 immediately throws off the lid 23 and at the same time throws the ring 51 upward. Simultaneously, the ring 51 is given a whirling movement by the untwisting of spring 40, which movement together with the springiness of the rattans throws the latter outward substantially in the plane of the wing or a plane parallel to the plane of travel of the aeroplane and spreads wide open the parachute 38. It should be noted that the springy or elastic ribs of the parachute ribs are wound around the central ring in the pocket in such fashion as to tend to spring open in a clockwise direction, while the spring 40 is wound so as to give the ring 51 an impulse in a counter-clockwise direction. This combination of impulses instantaneously spreads out the ribs to their full extent.

A modification of the mode of carrying and opening a parachute is shown in Figs. 6, 7 and 8. In these figures, the parachute cords are secured to a ring 60 made in two parts hinged on and carried by a rod 61. The rod 61 is itself hinged as at 62 to the rear edge of a wing 63 and in the latter is provided a pocket large enough to house the folded ring 60 and the parachute, which is folded over the ring in such manner that the opening of the ring will open the parachute sufficiently for the air current to enter under a large area thereof. The ring and parachute are placed in the pocket horizontally.

When the ring 60 and parachute are drawn out of the pocket far enough to clear the edge, the folded ring immediately is opened by the springs 64 and the parachute thereby spread open so that air can enter and fill it.

The mechanism for moving the ring out of its socket is also shown in these figures. As indicated, the rod 61 is hinged at the outer end of the pocket at 62. The other end of the rod is hinged to a second rod 65 which is in turn hinged to a longitudinally movable rod 66.

The latter rod 66 is carried in roller guides 67 and is secured to one end of a cord or cable 68 whose other end is fixed to a reel 69. Reel 69 is fixed to a cross shaft 70 carrying a second reel for operating the parachute in the other wing and both reels are turned through a sprocket wheel 71 fixed to shaft 70 and operable by chain 72 from a second sprocket 73 within the cockpit of the machine and provided with a crank handle 74.

A second modification is shown in Figs. 9 and 10. This is similar to that shown in Figs. 6, 7 and 8 in that a folding ring is used. It is different, however, in that the pockets are in the fuselage and in that the rings 60 are thrown free, being secured to the plane by cords 80 and to the parachute by cords 81. Also, the pockets are placed vertically, or substantially so, and the rod 82, to which the parts of ring 60 are hinged, is not itself hinged, as in Fig. 6, but is free from attachment to the aeroplane save through the ring 60 and cords 80.

The means for drawing the rings and parachutes from the pockets is shown in Figs. 9 and 10 and consists, in the form shown, of two arms 83 fixed at one end to a shaft 84 supported upon the fuselage by brackets 85 and upon the rear edge of a wing. The other ends of rods 83 are provided with hooks 86 in which ordinarily rest the ends of a shaft 82.

Shaft 84 may be rotated through bevel gears 87 by a cross shaft 88 which in turn is rotated by sprockets, chain and handle similar to those shown in Fig. 6, and when this is done the arms 83 lift the ring 60 and parachute out of the pocket, allowing the ring to spring open and thus initiate the opening of the parachute.

Figure 11:
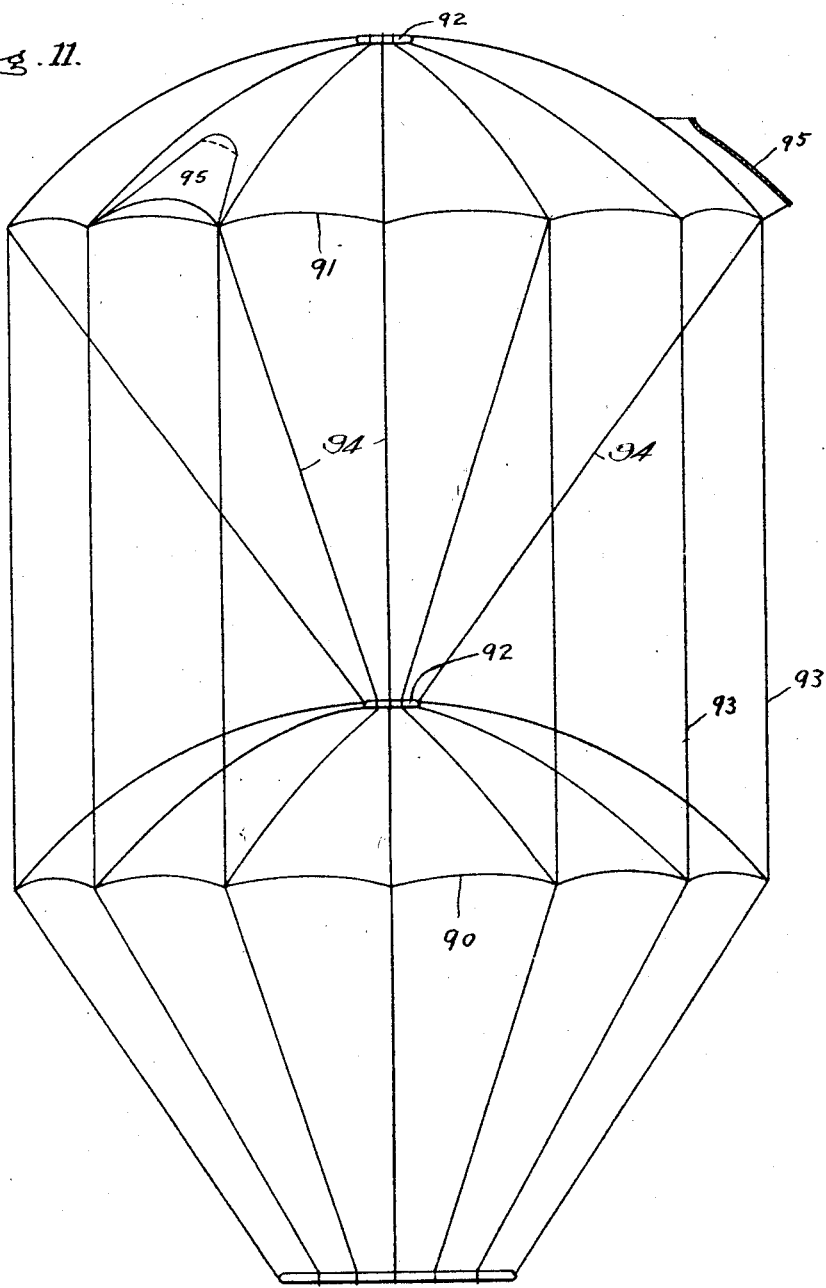
Fig. 11 is a side elevation of a novel form of parachute including stabilizers adaptable to this or other forms of parachutes.

In Fig. 11 there is shown a novel form of parachute and incidentally a form of stabilizer suitable for this or any other form of parachute.

In this figure, two small parachutes 90 and 91 are shown one above the other, each being provided with central stabilizing ringed openings 92. The parachutes are connected by parallel cords 93 extending from the outer ends of the seams of one to the outer ends of the seams of the other. They are also connected by cords 94 extending from the center ring 92 of the lower to the outer ends of the seams of the upper parachute. The chief advantage of this form of parachute lies in the fact that it gives a greater weight supporting capacity to a given horizontal dimension. This is important in the present use because of the small wing spread of certain kinds of rather heavy aeroplanes. This arrangement in itself is very stable, but further stabilization without loss of supporting area can be had by the use of the stabilizing pockets shown in parachute 91.

These pockets are indicated at 95 and consist of cloth pockets, open at both ends, attached to the upper side of the parachute at its edge in such fashion that air escaping from under this edge inflates the pocket and escapes through the upper opening therein which opening is much smaller than the lower one. These stabilizing pockets may, as stated above, be applied with benefit to any parachute and such is contemplated.

As indicated hereinbefore, it is contemplated to add strands of rattan to the parachutes to be used in the form of device shown in Figs. 1 to 5, and these strands may be reinforced with light strips or wires of spring steel for the purpose of adding to the strength and elasticity, and also to make the rattans function better in the unwinding when the parachute is ejected with a whirling motion. It is also within the purview of the invention to dispense with the rattan and use only the steel or other suitable metal strips and such construction is contemplated.

Having now described the invention and the preferred form of embodiment thereof, it is to be understood that said invention is not to be limited to the precise details described and shown but only by the scope of the claims which follow.

Claims:

1. A safety device for aeroplanes consisting of a parachute fixed to the aeroplane, said parachute being normally folded in a pocket in said aeroplane, and spring means for ejecting the parachute from the pocket and at the same time giving the central portion thereof a whirling movement whereby its opening is positively initiated.

2. A safety device for aeroplanes consisting of a parachute fixed to the aeroplane, said parachute being normally folded in a pocket in said aeroplane, means for ejecting the parachute from the pocket, and means for extending the parachute laterally substantially in a plane parallel to the plane of travel of the aeroplane.

3. Means for holding in and ejecting a parachute from a pocket, said means comprising a ring centrally located in said parachute and to which the parachute is attached, a vertical member within said ring and supported therein by means of a spider, an upright member fixed within said pocket and adapted to co-operate with the vertical member to prevent lateral movement of the parachute in the pocket, a spring associated with the upright member and adapted to be put under tension when the two members are associated in co-operative relation, and means for maintaining the parts in the latter relation.

4. Means for holding in and ejecting a parachute from a pocket, said means comprising a ring centrally located in said parachute and to which the parachute is attached, a vertical member within said ring and supported therein by means of a spider, an upright member fixed within said pocket and adapted to co-operate with the vertical member to prevent lateral movement of the parachute in the pocket, a spring associated with the upright member and adapted to be put under tension torsionally and also under compression when the two members are associated in co-operative relation, and means for maintaining the parts in the latter relation.

5. Means for holding in and ejecting a parachute from a pocket, said means comprising a ring centrally located in said parachute and to which the parachute is attached, a vertical tube within said ring and supported therein by means of a spider, an upright tube fixed within said pocket over which the vertical tube may be telescoped, a spring associated with the upright tube in such fashion as to be put under compression when the tubes are telescoped, and means to maintain the latter relation.

6. In combination a parachute having comparatively stiff but flexible members radiating from its central portion to its edge and means adapted to give said parachute a translating and whirling movement whereby to initiate the opening thereof.

7. In combination with parachute ejecting means wherein the parachute is given an outward and whirling movement, a parachute having strands of rattan radiating from its central portion to its edge.

8. An aeroplane having a pocket therein, a parachute secured to said aeroplane, said parachute having ribs of flexible elastic material and being adapted to be folded in said pocket with said ribs arranged in substantially flat spirals, and means for ejecting the folded parachute bodily from said pocket and for aiding the unfolding of the parachute.

ARTHUR E. FIXEL.